UNITED STATES PATENT OFFICE.

SEYMOUR M. HERMANN, OF NEW YORK, N. Y.

SIZING COMPOUND.

997,294. Specification of Letters Patent. Patented July 11, 1911.

No Drawing. Application filed January 21, 1911. Serial No. 603,979.

*To all whom it may concern:*

Be it known that I, SEYMOUR M. HERMANN, a citizen of the United States, and a resident of the city, county, and State of New York, have invented certain new and useful Improvements in Sizing Compounds, of which the following is a full, clear, and exact description.

The object of this invention is to produce a new composition for the purpose of sizing various articles, especially designed to be used on paper, and which compound will be much cheaper to manufacture than those at present in use, yet will produce the same effects, or better for the purpose designed.

The compound is to be usually mixed with a vehicle or body of any suitable nature or form. The present practice is to use a sizing compound, such for instance as casein, that is treated with various reagents, and to which other materials are added, such as starch or glue. This compound is usually mixed with a suitable vehicle such as clay or other earthy material, and then sometimes a solution of wax is added.

The purpose of the present invention is to provide a substitute for the materials that are mixed with this vehicle of clay and wax, or other materials, for producing a sizing compound.

My improved compound consists essentially of four ingredients, or three of these four ingredients. To these ingredients is also preferably added any suitable preservative material or compound, for the purpose of preventing the decomposition of the compound.

The invention broadly stated consists of a mixture of, first, a compound or material of a starchy nature, or preferably simply starch. Second, I employ a solution of moss, of any desired character. Third, I add a gum of suitable character. And the fourth component of my improved compound, is a soluble silicate. Instead of employing these four ingredients, either the gum may be omitted and the other three used, or else the moss can be left out and the other three employed.

In regard to the first-mentioned ingredient of my compound, the starch used may be either what is known in the chemical industries as a "direct" starch, or else what is termed an "inverted" starch. For the "direct" starch, I would mention that almost any of the known or general substances of this character may be employed. It may be derived from corn, wheat, rye, sweet potatoes or white potatoes, tapioca, sago, rice, cassava, beans or barley. Such starches are usually derived from the plants, that is from their fruit, or from their root. But it is to be understood that this element may consist of a modified starch, or an inverted starch; such as would be produced by the reaction of suitable chemical reagents, as acids, alkalis, diastifor, diastase, heat steam under pressure, or by the action of heat in combination with these said reagents. And under the term starch is also to be included dextrin. In regard to the second said component, the solution of moss can be of any of the mosses; Irish moss having been found very suitable for this purpose. The third ingredient of my new compound may be any of the substances known in the chemical art as a gum; and it is to be understood that this gum may be an exudation from a tree or plant, which is a gum produced by nature, or else it may be a synthetical gum, that is, one produced artifically by certain chemical reagents. As an example of the latter may be mentioned the compound known as "British gum," that is the resultant of the action on starch of a suitable chemical, such as an acid, or an alkali. This artificial compound has substantially all of the characteristics and properties of the gums produced in nature by the exudation from trees. The two gums that I have most used are gum tragosol, and gum tragacanth, and the latter is preferable giving as good results as any, and its cost being least. These three ingredients, or starch and either one of the others, the moss, or a gum, are combined with a soluble silicate. I preferably employ a silicate of an alkaline metal; a silicate of soda having been found to give very advantageous results.

It will therefore be understood that my improved compound preferably is formed of starch, solution of Irish moss, and a silicate of soda, or other soluble silicate. But practically as good results are obtained by a mixture of starch, a gum such as gum tragacanth, and a solution of silicate of soda. Or as above stated, I may employ these four ingredients, viz: starch, Irish moss, gum tragacanth, and silicate of soda.

As above stated, the general purpose is to employ this compound mixed with a suitable vehicle or carrying compound, such as clay and a solution of wax. But, it is the purpose of this invention to prepare as an article of manufacture for sale my said compound formed of the four recited ingredients, or the mixture of certain three of the same. This will preferably be supplied to the trade to be mixed by them, only as and when required for use, with the said vehicle.

It is also preferable, especially when the compound is not desired for immediate use to add to the compound any suitable preservative that will prevent reaction between the components, or any change in their nature. For instance: I may add carbolic acid dissolved in glycerin, or I may employ a mild solution of formalin for this purpose.

In regard to the preparation used, solutions of the moss, of the starch, and of the silicate of soda may be one per cent. solutions. As to the relative proportions of the three ingredients, I may use five parts of the starch solution, one part of the gum (or of the moss) and about six parts of the silicate of soda; that is, these twelve parts are added to about eighty-eight parts of the vehicle. But where the gum and moss are both used, I would employ five parts of starch solution, one part of moss solution, one-half part of the gum, and six parts of the solution of the silicate of soda; these to be added to about eighty-eight parts of the vehicle.

It will be thus seen that the compound that I have produced is comparatively cheap to furnish, and easy to prepare. The gums, or the Irish moss, are obviously much cheaper than the casein now usually employed for this purpose.

Having thus described my invention, I claim as new and desire to secure by Letters Patent:—

1. A sizing compound comprising starch, a gum, a solution of moss, and a soluble silicate.
2. A sizing compound comprising starch, a gum, a solution of Irish moss, and a soluble silicate.
3. A sizing compound comprising starch, gum tragacanth, a solution of moss, and a soluble silicate.
4. A sizing compound comprising starch, gum tragacanth, a solution of Irish moss, and a soluble silicate.
5. A sizing compound comprising starch, a gum, a solution of moss, and a soluble silicate of an alkaline metal.
6. A sizing compound comprising starch, a gum, a solution of Irish moss, and a soluble silicate of an alkaline metal.
7. A sizing compound comprising starch, gum tragacanth, a solution of moss, and a soluble silicate of an alkaline metal.
8. A sizing compound comprising starch, gum tragacanth, a solution of Irish moss, and a soluble silicate of an alkaline metal.
9. A sizing compound comprising starch, a solution of moss, and a soluble silicate.
10. A sizing compound comprising starch, a solution of moss, and a soluble silicate of an alkaline metal.
11. A sizing compound comprising starch, a solution of Irish moss, and a soluble silicate.
12. A sizing compound comprising starch, a solution of Irish moss, and a soluble silicate of an alkaline metal.

This specification signed and witnessed this 19th day of January A. D. 1911.

SEYMOUR M. HERMANN.

Witnesses:
W. A. TOWNER, Jr.,
WILLIAM H. REID.

---

Copies of this patent may be obtained for five cents each, by addressing the "Commissioner of Patents, Washington, D. C."